(12) United States Patent
Chun

(10) Patent No.: US 6,233,008 B1
(45) Date of Patent: May 15, 2001

(54) TARGET TRACKING METHOD AND DEVICE THEREFOR

(75) Inventor: In-seo Chun, Suwon (KR)

(73) Assignee: Samsung Thomson-CSF Co., Ltd., Kumi (KR)

( * ) Notice: Subject to any disclaimer, the term of this patent is extended or adjusted under 35 U.S.C. 154(b) by 0 days.

(21) Appl. No.: 09/095,728

(22) Filed: Jun. 11, 1998

(30) Foreign Application Priority Data

Jun. 11, 1997 (KR) .................................. 97-24206

(51) Int. Cl.$^7$ ....................................... H04N 7/18
(52) U.S. Cl. ............................. 348/170; 348/699
(58) Field of Search ...................... 348/170, 169, 348/415.1, 416.1, 417.1, 418.1, 699; H04N 7/18

(56) References Cited

U.S. PATENT DOCUMENTS

| | | | |
|---|---|---|---|
| 3,955,046 | 5/1976 | Inghamn et al. | 348/170 |
| 4,644,405 | 2/1987 | Roy et al. | 348/170 |
| 5,574,498 | 11/1996 | Sakamoto et al. | 348/169 |
| 5,583,947 | 12/1996 | Florent | 348/169 |
| 5,631,697 | 5/1997 | Nishimura et al. | 348/170 |
| 5,706,362 | 1/1998 | Yabe | 348/170 |
| 5,729,338 | 3/1998 | Houlberg et al. | 348/169 |
| 5,757,422 | 5/1998 | Matsumura | 348/169 |
| 5,940,145 * | 8/1999 | Burl | 348/699 |

FOREIGN PATENT DOCUMENTS

| | | |
|---|---|---|
| 5-113476 | 5/1993 | (JP) . |
| 5-62879 | 8/1993 | (JP) . |
| 5-307080 | 11/1993 | (JP) . |
| 6-130145 | 5/1994 | (JP) . |
| 6-281723 | 10/1994 | (JP) . |
| 9-318745 | 12/1997 | (JP) . |

\* cited by examiner

*Primary Examiner*—Howard Britton
(74) *Attorney, Agent, or Firm*—Robert E. Bushnell, Esq.

(57) ABSTRACT

In a target tracking method employing a block matching algorithm, pixels commonly included in target, background or foreground areas in consecutive frames are excluded from the calculation and only pixels in transition are taken into account. First, a first rectangular gate substantially including a target to be tracked is formed in an image of a first frame. Also, a second rectangular gate is formed in an image of a second frame temporally sequential to the first frame. Then, pixels commonly included in moving regions in the first and second rectangular gates are discriminated and a block matching level between the first and second rectangular gates is calculated by using only pixels of the moving region. Afterwards, the second rectangular gate is changed in a predetermined area, and the block matching level is calculated. Subsequently, the block matching level values are compared to determine a second rectangular gate which results in a maximum block matching level value, and a positional difference between the first rectangular gate and the second rectangular gate resulting in the maximum block matching level value is determined as a movement vector of the target.

29 Claims, 3 Drawing Sheets

TARGET TRACKING METHOD AND DEVICE THEREFOR

CLAIM OF PRIORITY

This application makes reference to, incorporates the same herein, and claims all benefits accruing under 35 U.S.C. §119 from an application entitled TARGET TRACKING METHOD AND DEVICE THEREFOR earlier filed in the Korean Industrial Property Office on Jun. 11, 1997, and there duly assigned Serial No. 97-24206 by that Office.

BACKGROUND OF THE INVENTION

1. Technical Field

The present invention relates to target tracking, and more particularly, to a method for tracking a target in an image which employs a block matching algorithm and a device therefor.

2. Related Arts

In general, in an automatic target tracking method which is used in radar signal processing, a motion of a target is automatically tracked, in order to make a decision based on the tracking data.

The automatic target tracking may look similar to an image compression method used in video equipment. However, only the motion of a predetermined target is relevant in the automatic target tracking while all objects in the image are relevant in the image compression method.

One conventional automatic target tracking method is a centroid tracking method using the center of gravity of a target. In the centroid tracking method, an image signal value of each pixel is compared with a predetermined threshold, and pixels are divided into target pixels and background pixels according to the comparison result to calculate the center of gravity of the pixel corresponding to the target. If B(h,v,m) indicates a binary image signal in which a value of the pixel corresponding to the target is one and a value of the pixel corresponding to the background is zero, the center of gravity of the target is expressed by:

$$C_h = \frac{\Sigma B(h,v,m) \times h}{\Sigma B(h,v,m)}, C_v = \frac{\Sigma B(h,v,m) \times v}{\Sigma B(h,v,m)} \quad (1)$$

In such a centroid tracking method, it is difficult to accurately calculate the center of gravity of the target if the background pixels are determined to be target pixels or vice versa. However, it is difficult to divide pixels in the image signal into a target pixels and background pixels since the image signal generally includes noise and the background changes. Accordingly, when the centroid tracking method is applied, it is difficult to repeatedly and accurately track the target.

Another conventional automatic target tracking method is a correlation coefficient tracking method. Here, a displacement of a moving target pixel is calculated from the correlation of temporal/spatial intensity differences of each pixel between two consecutive frames.

That is, when I(h,v,m) indicates an intensity function value of the pixel (h,v) in m-th frame, horizontal/vertical and temporal gradients which indicate intensity differences in a pixel unit is expressed by:

$$\nabla H(h,v,m) = \frac{I(h+1,v,m-1) - I(h-1,v,m-1)}{2} \quad (2)$$

$$\nabla V(h,v,m) = \frac{I(h,v+1,m-1) - I(h,v-1,m-1)}{2}$$

$$\nabla K(h,v,m) = I(h,v,m) - I(h,v,m-1)$$

Displacements Dh and Dv of a moving target in horizontal and vertical directions, respectively, between a (k−1)th frame and a k-th frame, are expressed by equation (3) by use of correlation coefficients of the gradients.

$$D_h = \frac{S_{hv}S_{tv} - S_{vv}S_{th}}{S_{vv}S_{hh} - S_{hv}^2}, D_v = \frac{S_{hv}S_{th} - S_{hh}S_{tv}}{S_{vv}S_{hh} - S_{hv}^2} \quad (3)$$

where, $$S_{xy} = \Sigma \nabla X(h,v,m) \nabla Y(h,v,m)$$

In the above correlation coefficient tracking method, the temporal gradient is expressed in terms of the spatial gradient by Taylor series expansion. However, the tracking performance is deteriorated with respect to a target moving at high speed in the case that higher-order terms are ignored in calculating the Taylor series expansion. For example, it is difficult to track a target when the speed of the target is 2 pixels or more per frame. Also, when the image includes a background, the tracking performance is deteriorated due to the gradient caused by the background.

Still another automatic target tracking method is a block matching algorithm. In this method, a template including a target is formed in a frame, and a subsequent frame is searched in order to determine where the information included in the template of the previous frame is located in the subsequent frame. For the purpose, candidate templates are sequentially formed in a predetermined searching area of the subsequent frame to calculate the similarity between each candidate template and the template of the previous frame. Then, the position difference between the candidate template showing the maximum similarity and the template of the previous frame is determined as the displacement of the target.

Some measures of the similarity are a normalized correlation coefficient, a mean of absolute difference (MAD), mean of squared differences (MSD), and a normalized invariate moment equation. For example, the mean of absolute difference between the templates is calculated by:

$$Q(d_m) = \frac{\Sigma |I(s,m) - I(s+d_m,m-1)|}{M} \quad (4)$$

where s denotes a two-dimensional position vector, $d_m$ denotes a two-dimensional expected displacement of a target, and M denotes the total number of pixels. Here, the expected displacement $d_m$ which results in the minimum of the mean of absolute difference is determined as the displacement of the target.

The block matching algorithm shows a stable performance even when an image signal includes noise. However, in case that the image signal includes a complex background component, the performance is deteriorated since the contribution of the difference in intensity function values of the background increases. Furthermore, it is difficult to implement a real-time system since a great deal of computation is involved.

Devices and methods for detecting and tracking objects are disclosed by U.S. Pat. No. 5,631,697 issued to Nishimura et al. entitled Video Camera Capable Of Automatic Target Tracking; U.S. Pat. No. 3,955,046 issued to Ingham et al. entitled Improvements Relating To Automatic Target Following Apparatus; U.S. Pat. No. 5,574,498 issued to Sakamoto et al. entitled Target Tracking System; U.S. Pat. No. 5,583,947 issued to Florent entitled Device For The Detection Of Objects In A Sequence Of Images; U.S. Pat. No. 4,644,405 issued to Roy et al. entitled Method And Apparatus For Scanning A Window In The Image Zone Of A Charge Transfer Device Of The Frame Transfer Type; U.S. Pat. No. 5,706,362 issued to Yabe entitled Image Tracking Apparatus; U.S. Pat. No. 5,757,422 issued to Matsumura entitled Tracking Area Determination Apparatus And Object Tracking Apparatus Utilizing The Same; and U.S. Pat. No. 5,729,338 issued to Houlberg et al. entitled Computer Controlled Optical Tracking System.

Although several devices and methods currently exist for tracking targets, I have discovered that an enhanced target tracking method and device would be desirable, in order to increase efficiency.

SUMMARY OF THE INVENTION

To solve the above problems, an object of the present invention is to provide a method of tracking a target in an image by a block matching algorithm which shows enhanced noise performance and stable tracking performance and reduces computation time so that a real-time system may be implemented.

Another object of the present invention is to provide a device for tracking a target in an image for implementing the above tracking method.

In a method for tracking a target to achieve one of the above objects, a first rectangular gate substantially including a target to be tracked is formed in an image of a first frame and a second rectangular gate is formed in an image of a second frame temporally sequential to the first frame.

Then, pixels commonly included in moving regions in the first and second rectangular gates are discriminated and a block matching level between the first and second rectangular gates is calculated by using only pixels of the moving region.

Afterwards, the second rectangular gate is changed in a predetermined area, and the block matching level is calculated.

Subsequently, the block matching level values are compared to determine a second rectangular gate which results in a maximum block matching level value, and a positional difference between the first rectangular gate and the second rectangular gate resulting in the maximum block matching level value is determined as a movement vector of the target.

To achieve another one of the above objects, the target tracking device is provided.

In the target tracking device, a frame memory receives an input image signal of a first frame, buffers such signal for one frame period, and outputs an image signal of a second frame delayed by one frame period;

An image difference generator receives the image signals of the first and second frames, generates a first rectangular gate substantially including a target to be tracked in the image of the first frame, forms a second rectangular gate in the image signal of the second frame, and calculates image difference between the first and second rectangular gates;

A moving region generator generates first and second moving templates by excluding pixels included in a target area, a background area or a foreground area from the first and second rectangular gates, respectively, based on the image difference output by said image difference generator.

A block matching unit calculates block matching levels between the first moving template and a plurality of the second moving templates, determines one of the second moving templates which results in a maximum block matching level value, and determines the spacial displacement of the second rectangular gate which corresponds to the second moving template resulting in the maximum block matching level value from the first rectangular gate as the motion vector of the target.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5A illustrates a first image of a target at a first moment in time, according to the principles of the present invention;

FIG. 5B illustrates a second image of the target of FIG. 5A at a second moment in time, according to the principles of the present invention; and FIG. 5C illustrates the first image of the target shown in FIG. 5A superimposed over the second image of the target shown in FIG. 5B, thereby forming first and second moving templates, according to the principles of the present invention.

DETAILED DESCRIPTION OF THE PREFERRED EMBODIMENTS

Figure 1A:
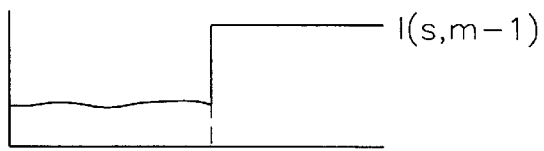
FIG. 1A shows an image signal of one horizontal line included in a gate of (m−1)-th frame.

In a preferred embodiment of the present invention, it is assumed that the intensity function I(s,m), which describes the intensity of pixels in an image, is expressed as described by equation 5 shown below by the weighted sum of three terms: O(s,m) indicating a region corresponding to a target, B(s,m) indicating a background region, and F(s,m) indicating a foreground region. Here, the background means a portion of the image which surrounds the target, and the foreground means a portion which screens some part of the target such as clutter.

$$I(s,m)=F(s)+[1-UF(s)]O(s,m)+[1-UF(s)][1-UO(s,m)]B(s) \quad (5)$$

In this equation, UF(s) and UO(s,m) are unit step functions which have the value of 1 when F(s) and O(s,m) have a non-zero intensity value and which have the value of 0 otherwise. Also, the variable s denotes two-dimensional spatial coordinates, i.e., a position vector, and the variable m denotes a frame index. Meanwhile, it is further assumed that the background and the foreground are at fixed positions regardless of the movement of the target, so that the frame index m is not used for the components.

In the equation 5, in the case that the position vector s is in the foreground area, the second and third terms become zero and only the first term may have a non-zero value. Also, in the case that the position vector s is in the target area, the first and third terms become zero and only the second term may have a non-zero value. Similarly, in the case that the position vector s indicates the background, the first and second terms become zero and only the third term may have a non-zero value.

Accordingly, such a representation makes it possible to express the intensity of each pixel of the image in terms of functions of the foreground, target and background area, and reflect the effect of each area on the target tracking when the target moves in the image.

If an object moves by d between (m−1)th and m-th frames, the intensity function of the target area in the m-th frame is expressed as follows.

$$O(s,m)=O(s+d,m-1) \quad (6)$$

If there is no foreground in the image, the equation 5 is expressed simply as follows:

$$I(s,m)=O(s,m)+[1-UO(s,m)]B(s) \quad (7)$$

Here, mean of the absolute differences (MAD) with respect to pixels in a gate is expressed by:

$$Q(d_m) = \frac{\Sigma \mid O(s+d, m-1) + [1 - UO(s+d, m-1)]B(s) - O(s+d_m, m-1) - [1 - UO(s+d_m, m-1)]B(s+d_m)\mid}{M} \quad (8)$$

Here, the intensity function I(s,m−1) of the (m−1)th frame is replaced with the intensity function I(s,m) of the m-th frame using the equation 6.

In the equation 8, when $Q(d_m)$ becomes a minimum, the expected displacement dm becomes actual displacement. At this time, the equation 8 will be simplified into equation 9.

$$Q(d_m) = \frac{\Sigma \mid [1 - UO(s+d, m-1)][B(s) - B(s+d)]\mid}{M} \quad (9)$$

Also, it is more preferable that the value becomes smaller, i.e., closer to zero.

It is noted in the equation 9 that the mean of absolute differences between I(s,m) and I(s,m−1) becomes the intensity difference of the background area in the case that the expected displacement $d_m$ is equal to the actual displacement d. Thus, if the background area is complicated, the term of the background area difference and the resultant magnitude of the mean of absolute differences become larger even when the expected displacement $d_m$ is equal to the actual displacement d, becomes larger, which deteriorates the tracking performance. Therefore, it is desirable that the background area is excluded from the calculation of the mean of the absolute differences in order to enhance the tracking performance.

Meanwhile, similar is the case when the expected displacement $d_m$ differs from the actual displacement d, which will be described with reference to FIGS. 1A through 1C. In such a case, the full representation of the equation 8 should be used.

Turn now to FIG. 1A, which shows an image signal of one horizontal line included in a gate of (m−1)-th frame. In addition, refer to FIG. 1B, which shows an image signal of one horizontal line included in a gate of m-th frame positionally corresponding to the horizontal line of FIG. 1A in the case that an actual displacement of the target is 'd' and the gate of m-th frame is fixed in the position of the gate of the (m−1)-th frame. Also, refer to FIG. 1C, which shows an image signal of a horizontal line in a gate of m-th frame positionally corresponding to the horizontal line of FIG. 1A in the case that an expected displacement of the target is $d_m$ and the gate of m-th frame is moved by the expected displacement of the target, $d_m$, from the position of the gate of the (m−1)-th frame.

Figure 1B:
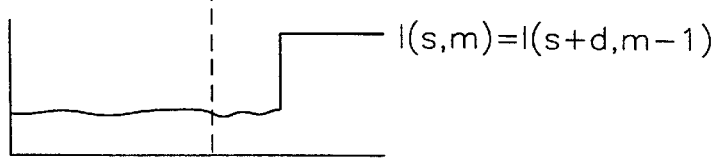
FIG. 1B shows an image signal of one horizontal line included in a gate of m-th frame positionally corresponding to the horizontal line of FIG. 1A in the case that an actual displacement of the target is 'd' and the gate of m-th frame is fixed in the position of the gate of the (m−1)-th frame.
Figure 1C:
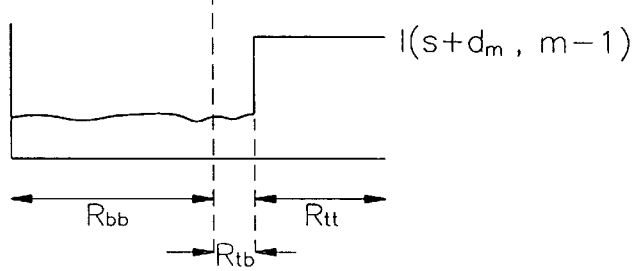
FIG. 1C shows an image signal of a horizontal line in a gate of m-th frame positionally corresponding to the horizontal line of FIG. 1A in the case that an expected displacement of the target is dm and the gate of m-th frame is moved by the expected displacement of the target, dm, from the position of the gate of the (m−1)-th frame.

As shown in FIG. 1B, when a gate is fixed on image signals between the m-th and (m−1)-th frames, only the target signal moves its relative position between the frames while background signals of the two frames are maintained to be same. Also, as shown in FIG. 1C, if the expected displacement of the target between image signals between the m-th and (m−1)-th frames is $d_m$, both the background signal and the target signal moves their position in the gate between the frames.

Accordingly, in considering the difference between the intensity function I(s,m−1) of a pixel in the (m−1)-th frame and the intensity function I(s,m) in the m-th frame, all the pixels in the image may be divided into three categories: an Rbb region which includes pixels belonging to the background area commonly in both frames, an Rtb region which includes pixels belonging to the target area in one frame but to the background area in another frame, and an Rtt region which includes pixels belonging to the target area commonly in both frames.

As described above, the operation result of the equation 8 becomes smaller as the expected displacement dm becomes closer to the actual displacement d.

However, for the Rbb region, complication of the background area has more critical effect than the exactness of the expected displacement $d_m$ on the operation result of the equation 8. For the Rtt region, the calculated value is almost constant regardless of the expected displacement $d_m$ if we assume that the intensity of a surface of the target is constant. Meanwhile, for the Rtb region, the calculated value changes rapidly depending on how much the expected displacement $d_m$ is closer to the actual displacement d. Furthermore, in the Rtb region, the calculated value becomes rapidly reduced if the expected displacement $d_m$ approaches the actual displacement d. Accordingly, if only the Rtb region is considered in the calculation of the equation 8, the tracking performance may be enhanced.

In the present invention, only the Rtb region is used for the calculation in the application of the block matching algorithm. The Rtb region, which is generated by the movement of the target is referred to as a moving region, hereinafter.

Meanwhile, the tracking performance may be deteriorated due to foreground area, also. In case that the foreground area exists in the image, the equation 5 will be expressed as follows.

$$Q(d_m) = \frac{\Sigma | F(s) - F(s+d) + [UF(s+d) - UF(s)]O(s+d, m-1) + \{[1 - UF(s)]B(s) - [1 - UF(s+d)]B(s+d)\}[1 - UO(s+d, m-1)]|}{M} \quad (10)$$

Here, the intensity function $I(s,m-1)$ of a pixel in the $(m-1)$-th frame is replaced with the intensity function $I(s,m)$ of a pixel in the m-th frame by using the equation 6.

According to a conventional block matching method, the absolute difference between $I(s,d)$ and $I(s+d,m-1)$ may be larger due to effect of the foreground area even in the case that the expected displacement $d_m$ is equal exactly to the actual displacement d. Accordingly, the tracking performance may be deteriorated due to foreground area. However, when only the moving region of the image frame is used for calculating the similarity between the frames, the deterioration of tracking performance due to the foreground area may be prevented since the foreground area is not included into the calculation.

Hereinafter, preferred embodiments of the present invention will be described with reference to the attached drawings.

Figure 2:
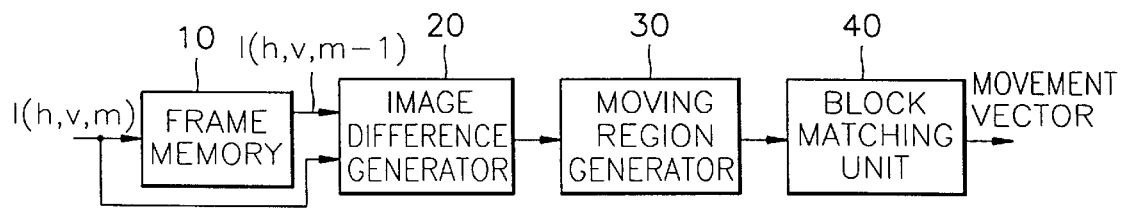
FIG. 2 is a block diagram of an embodiment of a target tracking device, according to the principles of the present invention.

Turn now to FIG. 2, which is a block diagram of a target tracking device, according to the principles of the present invention. Hereinafter, h and v denote horizontal and vertical coordinates, respectively.

The device of FIG. 2 includes a frame memory 10, an image difference generator 20, a moving region generator 30, and a block matching unit 40.

The frame memory 10 receives digital image signals which are sequentially input and carries out buffering of such signals in a frame unit to output image signals delayed by one frame. Therefore, while the digital image signal of the m-th frame is being input to the frame memory 10, the image signal of the (m-1)-th frame is output by the frame memory 10. The image difference generator 20 receives the image signals of the (m-1)th and the m-th frames. Afterwards, the image difference generator 20 generates a first rectangular gate which substantially surrounds a target to be tracked in an image of the (m-1)-th frame, and a second rectangular gate in an image of the m-th frame. In the present embodiment, in the case that the (m-1)-th frame is an initial frame of consecutive input images, a user may generate the first rectangular gate by designating the boundary of the gate region by use of an input unit (not shown) such that the target to be tracked is substantially included in the gate. A mouse or a track ball can be used for the input unit.

However, in an alternative of the present embodiment, which is another embodiment of the present invention, the first rectangular gate for the initial input image may be generated automatically based on a prediction algorithm by a computer program or information stored in a database. For example, in the field of tracking flight using radar, the first rectangular gate may be generated such that the gate covers a predetermined area including an airbase when an airplane on a flight plan appears in the neighborhood of the airbase.

In the case that the first rectangular gate is generated for the input image of the initial frame, the second rectangular gate may be generated at a same position as that of the first rectangular gate or sequentially generated within a search area of a predetermined range from the position of the first rectangular gate. For next frames, the second rectangular gate is sequentially generated within a search area of a predetermined range from the position shifted from the first rectangular gate by a motion vector of the target estimated in the predetermined stage.

The frame difference generator 20 generates a frame difference FD for each pixel. The frame difference is calculated by an absolute difference in pixel values between a current frame and a previous frame as follows.

$$FD(h, v) = |I(h, v, m) - I(h, v, m-1)| \quad (11)$$

Here, the horizontal and vertical coordinates h and v refer to coordinates in the rectangular gates rather than in the whole frames.

The frame difference FD may be used as an index for dividing pixels into an Rbb region, an Rtb region and an Rtt region if it is assumed that there is a large difference in intensity function values between the target area, and the background or the foreground area and the movement vector of the target between consecutive frames or the estimated movement vector calculated by the device is not large.

The moving region generator 30 removes pixels belonging to target area in both the m-th and (m-1)-th frames from the first and second rectangular gates based on the frame difference output by the frame difference generator 20. Also, the moving region generator 30 removes pixels belonging to the background area in both the frames or those belonging to the foreground area in both the frames from the first and second rectangular gates. As a result, pixels which are changed from the target area into the background area and vice versa and pixels which are changed from the target area into the foreground area and vice versa remain in the rectangular gates. The sets of such pixels are referred to as first and second moving templates in the present invention.

The removing operation is performed by determining whether the frame difference of each pixel is larger than a predetermined frame difference threshold FDth or not. That is, a frame difference index (FDI) for indicating that a pixel is included in the moving templates without removing from the rectangular gates is obtained as follows:

$$FDI(h, v) = 0, \quad \text{if } FD(h, v) > FDth \quad (12)$$
$$1, \quad \text{otherwise}$$

In the equation 12, the frame difference threshold FDth is determined to be an appropriate value between zero and the maximum value. A pixel is included in the first and second moving templates if the frame difference index FDI for the pixel is zero. On the other hand, a pixel is excluded from the first and second moving templates if the frame difference index FDI for the pixel is one.

Figure 5A:
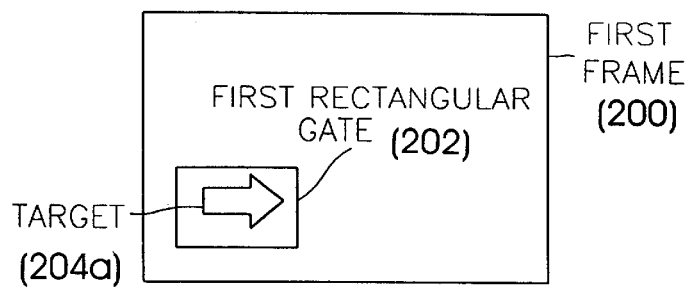
FIGS. 5A, 5B, and 5C illustrate the formation of first and second moving templates pertaining to a moving target, according to the principles of the present invention.
Figure 5B:
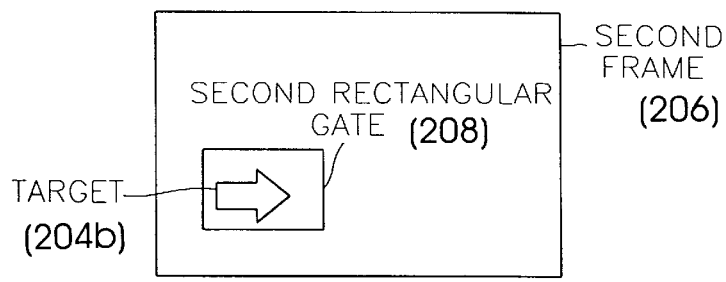
Figure 5C:
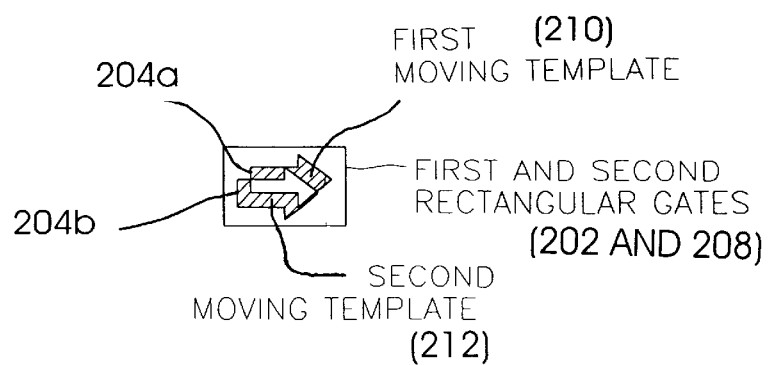

Turn now to FIGS. 5A, 5B, and 5C, which illustrate the formation of first and second moving templates pertaining to a moving target, according to the principles of the present invention. More particularly, FIG. 5A illustrates a first image of a target at a first moment in time, according to the principles of the present invention, FIG. 5B illustrates a second image of the target of FIG. 5A at a second moment in time, according to the principles of the present invention, and FIG. 5C illustrates the first image of the target shown in FIG. 5A superimposed over the second image of the target shown in FIG. 5B, thereby forming first and second moving templates, according to the principles of the present invention.

In FIG. 5A, a first frame 200 of a first image of a target 204a is shown. A first rectangular gate 202 is depicted substantially surrounding the target 204a. The target 204a shown in FIG. 5A is depicted in a position corresponding with a first moment in time.

At a second moment in time, the target 204a has moved to a new location. The new location of target 204a is depicted in FIG. 5B. In FIG. 5B, a second frame 206 of a second image of a target 204b is shown. A second rectangular gate 208 is depicted substantially surrounding the target 204b. The target 204b shown in FIG. 5B is depicted in a position corresponding with a second moment in time, after the first moment in time of FIG. 5A. Target 204a and target 204b represent the same object in two different locations.

In FIG. 5C, the first rectangular gate 202 is superimposed over the second rectangular gate 208. Similarly, the images contained within the first and second rectangular gates are superimposed over one another. More particularly, target 204a is superimposed over target 204b. The first moving template 210 is partly shaded. The second moving template 212 is partly shaded. The shaded areas of the first moving template 210 and of the second moving template 212 represent the pixels in transition. In other words, the only pixels in transition, in accordance with the principles of the present invention, are the pixels in the shaded regions shown in FIG. 5C. The shaded regions can also be referred to as moving regions and can also be referred to as the Rtb regions.

Importantly, the shaded regions in FIG. 5C include two types of pixels. The first type of pixels are those which are in the image of target 204a but which are not in the image of target 204b. The second type of pixels includes pixels which are in the image of target 204b but which are not in the image of target 204a. In this manner, the pixels in transition are identified, in accordance with the principles of the present invention.

Only a portion of the first and second rectangular gates which is changed from the target area to the foreground or the background area and vice versa is selected to generate moving templates as shown in FIG. 5C. In FIG. 5C, the hatched portion indicate the first and second moving templates in the first and second rectangular gates, respectively.

Meanwhile, in the present embodiment, the moving region generator 30 includes a filter for removing pixels which remains in the first and second moving templates due to impulse noise from the moving templates.

Figure 3:
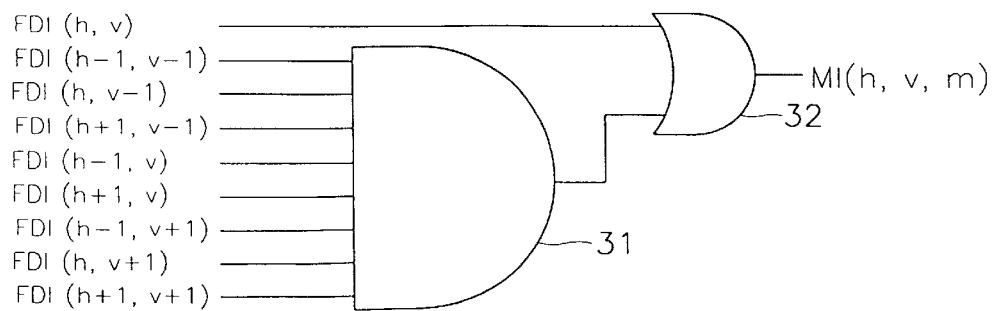
FIG. 3 is a circuit diagram of a filter in a moving region generator of FIG. 2, according to the principles of the present invention.

Turn now to FIG. 3, which shows a circuit diagram of a filter included in the moving region generator 30 in this preferred embodiment. An 8-input AND gate 31 receives frame difference indices of eight neighboring pixels around a current pixel to perform an AND operation. An OR gate 32 receives the frame difference index FDI(h,v) of the current pixel through one input terminal thereof and the output data of the AND gate 31 through the other input terminal, performs OR operation with respect to such signals, and outputs an operation result as a moving index MI(h,v,m).

Therefore, in the case that the frame difference index FDI(h,v) of the current pixel has a value of one so that the current pixel is excluded from the moving templates, the value of the moving index MI(h,v,m) also has a value of one to indicate that the current pixel must be excluded from the moving template. Also, in the case that the frame difference index FDI(h,v) has a value of zero so that the moving templates include the current pixel, the moving index MI(h,v,m) also has a value of zero when the AND gate 31 outputs a value of zero to indicate that the frame difference index of at least one of neighboring pixels is larger than the threshold.

However, even though the frame difference index FDI(h,v) has a value of zero so that the moving templates include the current pixel, the OR gate 31 outputs the moving index MI(h,v,m) of one when the AND gate 31 outputs a value of one to indicate that the frame difference indices of all the neighboring pixels are less than the threshold. Accordingly, the current pixel, which is regarded to include an impulse noise, is excluded from the moving templates.

In another embodiment of the present invention, the filter may be implemented by use of a look-up table instead of logic gates.

Meanwhile, the block matching unit 40 of FIG. 2 receives the frame difference indices of each pixel in the first and second moving templates, and calculates the block matching levels sequentially between the first moving template and a plurality of second moving templates. The block matching level is calculated by use of conventional evaluation functions such as normalized correlation coefficients, mean of absolute difference (MAD), mean of squared difference and a normalized invariate moment equation. Afterwards, the block matching unit 40 determines which of the plurality of second moving templates results in the maximum block matching level. Then, a spatial displacement of the second rectangular gate corresponding to such second moving template from the first rectangular gate is determined to be the motion vector of the target.

Meanwhile, in another embodiment of the present invention, the block matching unit 40 may input the moving index MI of each pixel together with image signals of first and second rectangular gates to calculate the block matching level by using intensity function values of the pixels having moving indices MI zero.

Figure 4:
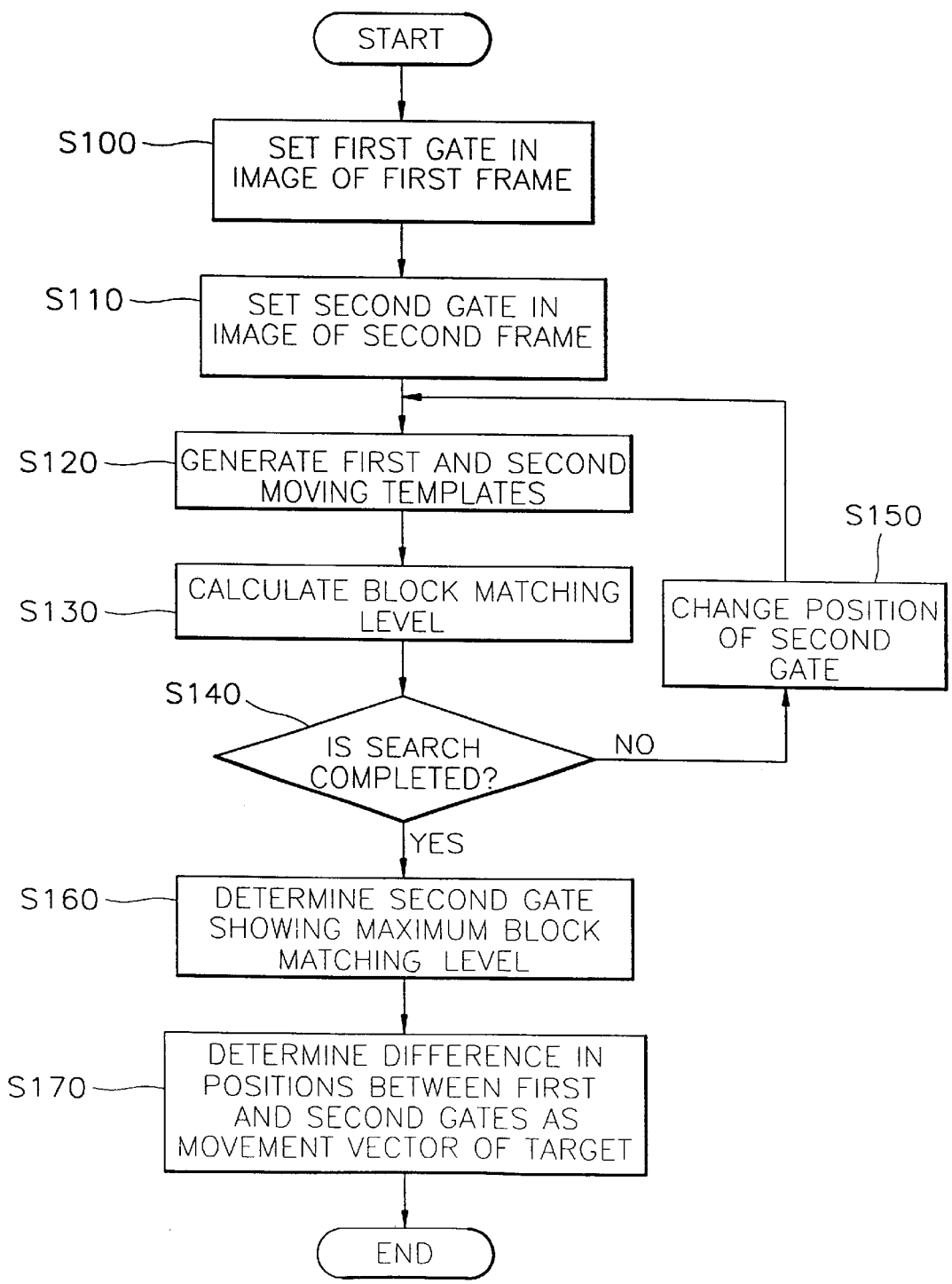
FIG. 4 is a flowchart illustrating an embodiment of a target tracking method, according to the principles of the present invention.

Turn now to FIG. 4, which is a flowchart showing an embodiment of a method for tracking a target, according to the principles of the present invention.

At step S100, a first rectangular gate substantially surrounding a target to be tracked is formed in an image of a first frame. At step S110, a second rectangular gate is set at a position positionally corresponding to the first rectangular gate in an image of a second frame which follows the first frame. At step S120, first and second moving templates, which consist of pixels which are included in the moving region in first and second rectangular gates, respectively, are generated. For the purpose, the image of the first rectangular gate is subtracted from the image of the second rectangular gate and an absolute value of the subtraction result is calculated to obtain a frame difference index (FDI) in a pixel unit. Afterwards, a pixel is regarded to be commonly included in a target area, a background area or a foreground area in the two rectangular gates and excluded from the rectangular gates if the frame difference index of the pixel is smaller than a predetermined threshold, but maintained in the rectangular gates if the frame difference index of the pixel is larger than the threshold. Also, the pixels including impulse noise are excluded from the first and second moving templates, which was described above.

At step S130, the block matching level between the first and second rectangular gates is calculated by using only pixels included in the first and second moving templates.

At step S140, it is determined whether the block matching level is calculated for all the second rectangular gates which can be formed in the search area. In other words, at step S140 it is determined whether the search is completed. If the search is not completed, the steps S150, S120 and S130 are repeatedly carried out.

At step S140, if it is determined that the search is not completed, then step S150 is is performed. At step S150, the position of the second rectangular gate is changed in a predetermined search area, and the steps S120 and S130 are repeated to form the first and second moving templates in the first and second rectangular gates and obtain the block matching level between the first and second rectangular gates.

At step S140, if it is determined that the search is completed, then step S160 is performed. At step S160, the second rectangular gate which results in the maximum block matching level is determined. At step S170, a positional difference between the second and first rectangular gates is determined to be the movement vector of the target.

Afterwards, the tracking process is continued by replacing the first frame with the second frame, and inputting a third frame as a new second frame. In this stage, a movement vector of the target is estimated based on the target movement vector obtained from the previous stage, and a second rectangular gate is formed around a position shifted from the position corresponding to the first rectangular gate by an estimated movement vector. Then, the steps S120 through S170 are performed.

The method and device for tracking a target according to the present invention can be implemented in real-time since the block matching algorithm is realized by using some portion of pixels in a gate image and the calculation burden is small, which may. Also, noise performance is enhanced and tracking performance is stabilized since an impulse noise is filtered to be removed. Meanwhile, additional calculation burden in not incurred in generating a moving template since a frame difference signal used for calculating the block matching level is used for the purpose.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for tracking a target, comprising the steps of:
   (a) forming a first tracking window at a first position in a first image, said first tracking window substantially including said target;
   (b) forming a second tracking window at a first position in a second image temporally sequential to said first image;
   (c) discriminating a first plurality of pixels included in a first plurality of regions of said first and second tracking windows, and utilizing block matching to calculate a first block matching value between said first and second tracking windows by analyzing only said first plurality of pixels of said first plurality of regions;
   (d) modifying said second tracking window in a predetermined manner to thereby form a third tracking window at a second position in said second image, said second position in said second image being separately located from said first position in said second image;
   (e) discriminating a second plurality of pixels included in a second plurality of regions of said first and third tracking windows, and utilizing block matching to calculate a second block matching value between said first and third tracking windows by analyzing only said second plurality of pixels of said second plurality of regions; and
   (f) comparing said first block matching value with said second block matching value, selecting a final tracking window corresponding to a maximum block matching value, and determining a positional difference between said first tracking window and said final tracking window resulting in the maximum block matching value as a movement vector of said target, said final tracking window being selected from one among said second tracking window and said third tracking window.

2. The method of claim 1, wherein said first and second positions in said second image correspond to first localities near said first position in said first image when said first image corresponds to an initial image, and said first and second positions in said second image correspond to second localities near a new position shifted from said first position in said first image by a movement vector of said target earlier estimated when said first image does not correspond to said initial image.

3. The method of claim 1, wherein said step (c) further comprises the steps of:
   (c1) identifying a third first plurality of pixels included in a first target area in said first tracking window, a first background area in said first tracking window, a second target area in said second tracking window, and a second background area in said second tracking window, said first target area separately located from said first background area, and said second target area being separately located from said second background area;
   (c2) identifying said first plurality of pixels from among said third plurality of pixels, said first plurality of pixels including only transition pixels;
   (c3) said transition pixels further comprising:
      pixels included in said first target area and not included in said second target area; and
      pixels included in said first background area and not included in said second background area; and
   (c4) utilizing block matching to calculate said first block matching value between said first and second tracking windows by analyzing pixels including only said first plurality of pixels.

4. The method of claim 3, wherein said step (c1) further comprises the steps of:
   calculating a frame difference index of a first pixel by subtracting an intensity function value of said first pixel in said first image from an intensity function value of a said first pixel in said second image; and
   identifying said first pixel as being included in said second target area when said frame difference index of said first pixel is within a first predetermined set of limits.

5. The method of claim 3, wherein said step (c1) further comprises the steps of:
  calculating a frame difference index of a first pixel by subtracting an intensity function value of said first pixel in said first image from an intensity function value of a said first pixel in said second image; and
  identifying said first pixel as being included in said second background area when said frame difference index of said first pixel is within a first predetermined set of limits.

6. The method of claim 3, wherein said step (c1) further comprises the steps of:
  calculating a frame difference index of a first pixel by subtracting an intensity function value of said first pixel in said first image from an intensity function value of a said first pixel in said second image; and
  identifying said first pixel as being included in said first target area when said frame difference index of said first pixel is within a first predetermined set of limits.

7. The method of claim 3, wherein said step (c1) further comprises the steps of:
  calculating a frame difference index of a first pixel by subtracting an intensity function value of said first pixel in said first image from an intensity function value of a said first pixel in said second image; and
  identifying said first pixel as being included in said first background area when said frame difference index of said first pixel is within a first predetermined set of limits.

8. The method of claim 1, wherein said step (c) further comprises the steps of:
  (c1) identifying a third plurality of pixels included in a first target area in said first tracking window, a first background area in said first tracking window, a second target area in said second tracking window, and a second background area in said second tracking window;
  (c2) identifying said first plurality of pixels from among said third plurality of pixels, said first plurality of pixels including only transition pixels;
  (c3) said transition pixels further comprising:
    pixels included in said first target area and not included in said second target area; and
    pixels included in said first background area and not included in said second background area;
  (c4) identifying a fourth plurality of pixels from among said third plurality of pixels, said fifth plurality of pixels corresponding to impulse noise; and
  (c5) utilizing block matching to calculate said first block matching value between said first and second tracking windows by analyzing pixels including only said first plurality of pixels and excluding said fourth pluralities of pixels.

9. The method of claim 8, wherein said step (c1) further comprises the steps of:
  calculating a frame difference index of a first pixel by subtracting an intensity function value of said first pixel in said first image from an intensity function value of a said first pixel in said second image; and
  identifying said first pixel as being included in said second target area when said frame difference index of said first pixel is within a first predetermined set of limits.

10. The method of claim 8, wherein said step (c1) further comprises the steps of:
  calculating a frame difference index of a first pixel by subtracting an intensity function value of said first pixel in said first image from an intensity function value of a said first pixel in said second image; and
  identifying said first pixel as being included in said second background area when said frame difference index of said first pixel is within a first predetermined set of limits.

11. The method of claim 8, wherein a first noise test pixel selected from among said third plurality of pixels correspond to impulse noise when a frame difference index of said first noise test pixel is within a first predetermined set of limits and frame difference indices of a predetermined quantity of pixels near said first noise test pixel are within a second predetermined set of limits.

12. The method of claim 11, wherein said predetermined quantity of pixels corresponds to eight.

13. The method of claim 1, wherein said step (c) further comprises the steps of:
  (c1) identifying a third plurality of pixels, said third plurality of pixels including pixels located in a first target area, a first background area, and a first foreground area in said first tracking window, and also including pixels located in a second target area, a second background area, and a second foreground area in said second tracking window;
  (c2) identifying said first plurality of pixels from among said third plurality of pixels, said first plurality of pixels including only transition pixels;
  (c3) said transition pixels further comprising:
    pixels included in said first target area and not included in said second target area;
    pixels included in said first background area and not included in said second background area; and
    pixels included in said first foreground area and not included in said second foreground area; and
  (c4) utilizing block matching to calculate said first block matching value between said first and second tracking windows by analyzing pixels including only said first plurality of pixels.

14. The method of claim 13, wherein said step (c1) further comprises the steps of:
  calculating a frame difference index of a first pixel by subtracting an intensity function value of said first pixel in said first image from an intensity function value of said first pixel in said second image; and
  identifying said first pixel as being included in one area in said first tracking window selected from among said first target area, said first background area, and said first foreground area, when said frame difference index of said first pixel is within a first predetermined set of limits.

15. The method of claim 13, wherein said step (c1) further comprises the steps of:
  calculating a frame difference index of a first pixel by subtracting an intensity function value of said first pixel in said first image from an intensity function value of said first pixel in said second image; and
  identifying said first pixel as being included in one area in said second tracking window selected from among said second target area, said second background area, and said second foreground area, when said frame difference index of said first pixel is within a first predetermined set of limits.

16. The method of claim 1, wherein said step (c) further comprises the steps of:

(c1) identifying a third plurality of pixels, said third plurality of pixels including pixels located in a first target area, a first background area, and a first foreground area in said first tracking window, and also including pixels located in a second target area, a second background area, and a second foreground area in said second tracking window;

(c2) identifying said first plurality of pixels from among said third plurality of pixels, said first plurality of pixels including only transition pixels;

(c3) said transition pixels further comprising:
pixels included in said first target area and not included in said second target area;
pixels included in said first background area and not included in said second background area; and
pixels included in said first foreground area and not included in said second foreground area; and (c4) identifying a fourth plurality of pixels from among said third plurality of pixels, said fourth plurality of pixels corresponding to impulse noise; and (c5) utilizing block matching to calculate said first block matching value between said first and second tracking windows by analyzing pixels including only said first plurality of pixels and excluding said fourth plurality of pixels.

17. The method of claim 16, said step (c1) further comprising the steps of:
calculating a frame difference index of a first pixel by subtracting an intensity function value of said first pixel in said first image from an intensity function value of a said first pixel in said second image; and
identifying said first pixel as being included in one area in said first tracking window selected from among said first target area, said first background area, and said first foreground area, when said frame difference index of said first pixel is within a first predetermined set of limits.

18. The method of claim 16, said step (c1) further comprising the steps of:
calculating a frame difference index of a first pixel by subtracting an intensity function value of said first pixel in said first image from an intensity function value of a said first pixel in said second image; and
identifying said first pixel as being included in one area in said second tracking window selected from among said second target area, said second background area, and said second foreground area, when said frame difference index of said first pixel is within a first predetermined set of limits.

19. The method of claim 16, wherein a first noise test pixel selected from among said third plurality of pixels corresponds to impulse noise when a frame difference index of said first noise test pixel is within a first predetermined set of limits and frame difference indices of a predetermined quantity of pixels near said first noise test pixel are within a second predetermined set of limits.

20. The method of claim 19, wherein said predetermined quantity of pixels corresponds to eight.

21. An apparatus tracking a target, comprising:
a frame memory unit receiving an image signal of a first frame, buffering said input image signal for one frame period, and outputting an image signal of a second frame delayed by one frame period;
an image difference generator unit receiving said image signals of said first and second frames, generating a first rectangular gate substantially including a target to be tracked in said image of said first frame, forming a second rectangular gate in said image signal of said second frame, and calculating image difference between said first and second rectangular gates;
a moving region generator unit generating first and second moving templates by excluding pixels corresponding to one area selected from a target area, a background area, and a foreground area, from said first and second rectangular gates, respectively, based on said image difference output by said image difference generator unit; and
a block matching unit for calculating block matching levels between said first moving template and a plurality of second moving templates, identifying one of said plurality of second moving templates which results in a maximum block matching level value, and determining the spacial displacement of said second rectangular gate which corresponds to said second moving template resulting in said maximum block matching level value from said first rectangular gate as a motion vector of said target.

22. The apparatus of claim 21, wherein said moving region generator unit comprises a filter excluding a pixel having impulse noise from said first and second moving templates.

23. The apparatus of claim 22, wherein said filter comprises:
a logical AND gate receiving frame difference indices of a predetermined number of pixels around a current pixel to perform a logical OR operation with respect to said indices; and
a logical OR gate receiving a frame difference index of said current pixel through an input terminal thereof and output data of said logical OR gate through another input terminal to perform a logical AND operation.

24. The apparatus of claim 23, wherein said logical AND gate corresponds to an eight-input logical AND gate.

25. The method of claim 1, wherein said first tracking window has a rectangular shape.

26. The method of claim 1, wherein said second tracking window has a rectangular shape.

27. The method of claim 1, wherein said first plurality of regions of said first and second tracking windows further comprise a target area in said first tracking window and a background area in said second tracking window.

28. A method for tracking a target, comprising the steps of:
forming a first tracking gate at a first position in a first image, said first tracking gate substantially including said target;
forming a second tracking gate at a first position in a second image temporally sequential to said first image;
discriminating a first plurality of pixels commonly included in a first plurality of regions of said first and second tracking gates;
utilizing block matching to calculate a first block matching value between said first and second tracking gates by analyzing only said first plurality of pixels of said first plurality of regions;
modifying said second tracking gate in a predetermined manner to thereby form a third tracking gate at a second position in said second image, said second position in said second image being distinguishable from said first position in said second image;
identifying a second plurality of pixels commonly included in a second plurality of regions of said first and third tracking gates, and using block matching to calculate a second block matching value between said first and third tracking gates by analyzing only said second plurality of pixels of said second plurality of regions;

comparing said first block matching value with said second block matching value, selecting a final tracking gate corresponding to a maximum block matching value, and determining a positional difference between said first tracking gate and said final tracking gate resulting in the maximum block matching value as a movement vector of said target, said final tracking gate being selected from one among said second tracking gate and said third tracking gate;

said first and second positions in said second image corresponding to first localities near said first position in said first image when said first image corresponds to an initial image; and said first and second positions in said second image corresponding to second localities near a new position shifted from said first position in said first image by a movement vector of said target earlier estimated when said first image does not correspond to said initial image.

29. The method of claim 28, wherein said discriminating and utilizing steps further comprise the steps of:

identifying a third plurality of pixels included in a first target area in said first tracking gate, a first background area in said first tracking gate, a second target area in said second tracking gate, and a second background area in said second tracking gate, said first target area being separately located from said first background area, and said second target area being separately located from said second background area;

calculating a frame difference index of a first pixel by subtracting an intensity function value of said first pixel in said first image from an intensity function value of said first pixel in said second image, and identifying said first pixel as being included in said second target area when said frame difference index of said first pixel is within a first predetermined set of limits;

identifying said first plurality of pixels from among said third plurality of pixels, said first plurality of pixels including only transition pixels;

said transition pixels further comprising:
  pixels included in said first target area and not included in said second target area; and
  pixels included in said first background area and not included in said second background area; and utilizing block matching to calculate said first block matching value between said first and second tracking windows by analyzing pixels including only said first plurality of pixels.

* * * * *